United States Patent
Lazur (10) Patent No.: US 9,757,920 B2
(45) Date of Patent: Sep. 12, 2017

(54) FLEXIBLE CERAMIC MATRIX COMPOSITE SEAL

(71) Applicant: Rolls-Royce Corporation, Indianapolis, IN (US)

(72) Inventor: Andrew J. Lazur, Huntington Beach, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 14/140,663

(22) Filed: Dec. 26, 2013

(65) Prior Publication Data

US 2014/0363622 A1 Dec. 11, 2014

Related U.S. Application Data

(60) Provisional application No. 61/792,920, filed on Mar. 15, 2013.

(51) Int. Cl.
*B32B 5/26* (2006.01)
*B32B 18/00* (2006.01)
(Continued)

(52) U.S. Cl.
CPC .............. *B32B 5/26* (2013.01); *B32B 18/00* (2013.01); *C04B 35/117* (2013.01); *C04B 35/563* (2013.01); *C04B 35/565* (2013.01); *C04B 35/803* (2013.01); *C04B 35/806* (2013.01); *F01D 11/005* (2013.01); *F02C 7/28* (2013.01); *C04B 2235/5224* (2013.01); *C04B 2235/5228* (2013.01); *C04B 2235/5244* (2013.01); *C04B 2235/5248* (2013.01); *C04B 2235/5252* (2013.01); *C04B 2235/614* (2013.01); *C04B 2235/616* (2013.01); *C04B 2235/945* (2013.01); *C04B 2237/343* (2013.01); *C04B 2237/36* (2013.01); *C04B 2237/365* (2013.01);
(Continued)

(58) Field of Classification Search
CPC ......... F16J 15/3288; F02C 7/28; B32B 18/00; B32B 5/26; B32B 5/28; F01D 11/005; F01D 11/006; Y10T 428/24777
USPC ..... 428/174, 293.4, 192; 277/405, 628, 650, 277/651, 654; 415/174.2
See application file for complete search history.

(56) References Cited

U.S. PATENT DOCUMENTS

| 4,989,886 A | 2/1991 | Rulis |
| 5,304,031 A | 4/1994 | Bose |

(Continued)

FOREIGN PATENT DOCUMENTS

| EP | 2052853 A2 | 4/2009 |
| EP | 2213841 B1 | 12/2011 |

(Continued)

OTHER PUBLICATIONS

International Search Report for PCT International Application Serial No. PCT/US2014/022387, dated Jun. 18, 2014.

*Primary Examiner* — Joanna Pleszczynska
(74) *Attorney, Agent, or Firm* — Brinks Gilson & Lione (57) ABSTRACT

A ceramic matrix composite seal is disclosed. The ceramic matrix composite seal including a ceramic matrix and a number of ceramic fiber fabrics embedded in the ceramic matrix. The ceramic matrix composite seal is formed into a strip with a desired geometry such that the seal strip is configured to be assembled with a number of components to create a seal between the components.

15 Claims, 4 Drawing Sheets

(51) Int. Cl.
  *F02C 7/28* (2006.01)
  *C04B 35/117* (2006.01)
  *C04B 35/563* (2006.01)
  *C04B 35/565* (2006.01)
  *C04B 35/80* (2006.01)
  *F01D 11/00* (2006.01)

(52) U.S. Cl.
  CPC ...... *C04B 2237/38* (2013.01); *C04B 2237/64* (2013.01); *F05D 2240/57* (2013.01); *F05D 2300/6033* (2013.01); *F05D 2300/6034* (2013.01); *Y02T 50/672* (2013.01); *Y10T 428/24174* (2015.01); *Y10T 428/24479* (2015.01); *Y10T 428/24628* (2015.01); *Y10T 428/24669* (2015.01); *Y10T 442/3528* (2015.04)

(56) References Cited

U.S. PATENT DOCUMENTS

| | | |
|---|---|---|
| 5,358,262 A | 10/1994 | Roberts |
| 5,615,893 A | 4/1997 | Reagan |
| 6,497,776 B1 | 12/2002 | Butler et al. |
| 7,387,758 B2 * | 6/2008 | Merrill et al. ............ 264/257 |
| 7,497,443 B1 | 3/2009 | Steinetz et al. |
| 7,771,159 B2 | 8/2010 | Johnson et al. |
| 7,798,769 B2 | 9/2010 | Keller |
| 7,802,799 B1 | 9/2010 | Semmes |
| 7,870,738 B2 | 1/2011 | Zborovsky et al. |
| 8,132,442 B2 | 3/2012 | Merrill et al. |
| 8,257,029 B2 | 9/2012 | Habarou et al. |
| 8,359,865 B2 | 1/2013 | Dierberger |
| 8,359,866 B2 | 1/2013 | Dierberger |
| 2005/0186878 A1 * | 8/2005 | Kostar et al. ............ 442/327 |
| 2007/0120328 A1 | 5/2007 | Haselbacher et al. |
| 2010/0002144 A1 | 1/2010 | Choi |
| 2010/0074729 A1 * | 3/2010 | Merrill et al. ............ 415/139 |
| 2010/0291349 A1 | 11/2010 | Merrill et al. |
| 2010/0327535 A1 | 12/2010 | Grace et al. |
| 2010/0327537 A1 | 12/2010 | Johnson et al. |

FOREIGN PATENT DOCUMENTS

| | | |
|---|---|---|
| JP | 2000271736 A | 10/2000 |
| WO | 2012060367 A1 | 5/2012 |

* cited by examiner

FLEXIBLE CERAMIC MATRIX COMPOSITE SEAL

CROSS REFERENCE TO RELATED APPLICATIONS

This application claims priority to and the benefit of U.S. Provisional Patent Application No. 61/792,920, filed 15 Mar. 2013, the disclosure of which is now incorporated herein by reference.

FIELD OF THE DISCLOSURE

The present disclosure relates generally to ceramic matrix composite seals, and more specifically to a ceramic matrix composite seal including a ceramic matrix and a number of ceramic fiber fabrics embedded in the ceramic matrix to form the ceramic matrix composite seal with a desired geometry.

BACKGROUND

Economical and environmental concerns, for example, improving efficiency and reducing emissions, are driving an increasing demand for higher gas turbine operating temperatures. The temperature capability of hot section components in gas turbine engines is currently one limitation to improving efficiency and emissions of many gas turbine engines. Improvements in cooling, materials, and coatings may be able to achieve higher inlet temperatures. Therefore, interest in high temperature materials, such as, for example, ceramic-based materials is growing.

One hot section component includes a strip seal. Strip seals, also called feather seals, may be used to eliminate leakage flow between two components arranged adjacently to one another. This may be achieved by the two components having groove recesses in edge faces that lie substantially opposite and adjacent one another. The strip seal seals the gap between the two components by being at least partially received into the groove recesses of the adjacently fitted components to span the gap between the components. The grooved recesses of fitted components often do not perfectly align due to, for example, manufacturing tolerances or thermal expansion.

SUMMARY

The present application discloses one or more of the features recited in the appended claims and/or the following features which, alone or in any combination, may comprise patentable subject matter.

A ceramic matrix composite seal may include a ceramic matrix, a first fiber assembly, and a second fiber assembly. The first fiber assembly is embedded in the ceramic matrix. The first fiber assembly includes a first top fabric and a second top fabric. The second fiber assembly is embedded in the ceramic matrix. The second fiber assembly includes a first bottom fabric and a second bottom fabric. The second fiber assembly is spaced apart from and opposite the first fiber assembly.

The second top fabric of the first fiber assembly is coupled to the first bottom fabric of the second fiber assembly by the ceramic matrix. The first top fabric and the second top fabric determine the shape of the first fiber assembly. The first bottom fabric and the second bottom fabric determine the shape of the second fiber assembly.

In some embodiments, the second fiber assembly is about flat. The first fiber assembly includes a depression along a length of the first fiber assembly at a center of the first fiber assembly. The depression extends toward the second fiber assembly.

In some embodiments, the first fiber assembly includes a first depression along a length of the first fiber assembly at a center of the first fiber assembly, the first depression extending toward the second fiber assembly, and the second fiber assembly includes a second depression along a length of the second fiber assembly at a center of the second fiber assembly, and the second depression extends toward the first fiber assembly.

In some embodiments, the first top fabric may include a first portion, a second portion, and a third portion coupled between the first and the second portions. The first and second portions of the first top fabric may lie in a first plane. The third portion of the first top fabric may lie in a second plane spaced apart from, parallel with, and below the first plane.

The second top fabric may include a first portion, a second portion, and a third portion coupled between the first and the second portions. The first and second portions of the second top fabric may lie in the second plane. The third portion of the second top fabric may lie in a third plane spaced apart from, parallel with, and below the second plane.

The first bottom fabric may include a first portion, a second portion, and a third portion coupled between the first and the second portions. The first, second, and third portions of the first bottom fabric may lie in a fourth plane spaced apart from, parallel with, and below the third plane.

The second bottom fabric may include a first portion, a second portion, and a third portion coupled between the first and the second portions. The first, second, and third portions of the second bottom fabric may lie in a fifth plane spaced apart from, parallel with, and below the fourth plane.

In some embodiments, the first top fabric may include a first portion, a second portion, and a third portion coupled between the first and the second portions. The first and second portions of the first top fabric may lie in a first plane. The third portion of the first top fabric may lie in a second plane spaced apart from, parallel with, and below the first plane.

The second top fabric may include a first portion, a second portion, and a third portion coupled between the first and the second portions. The first and second portions of the second top fabric may lie in the second plane. The third portion of the second top fabric may lie in a third plane spaced apart from, parallel with, and below the second plane.

The first bottom fabric may include a first portion, a second portion, and a third portion coupled between the first and the second portions. The first and the second portions of the first bottom fabric may lie in a fourth plane spaced apart from, parallel with, and below the third plane. The third portion of the first bottom fabric may lie in a fifth plane spaced apart from, parallel with, and below the fourth plane.

The second bottom fabric may include a first portion, a second portion, and a third portion coupled between the first and the second portions. The first and second portions of the second bottom fabric may lie in the fifth plane. The third portion of the second bottom fabric may lie in a sixth plane spaced apart from, parallel with, and below the fifth plane. In some embodiments, the ceramic matrix composite seal may include reinforcement structure extending through the third portions of the first top fabric, second top fabric, first bottom fabric, and the second bottom fabric in a direction about perpendicular to the first plane.

In some embodiments, the first top fabric may include a first portion, second portions, and a third portion coupled between the first and the second portions. The first and second portions of the first top fabric may lie in a first plane. The third portion of the first top fabric may lie in a second plane spaced apart from, parallel with, and below the first plane.

The second top fabric may include a first portion, a second portion, and a third portion coupled between the first and the second portions. The first and third portions of the second top fabric may lie in a third plane spaced apart from, parallel with, and below the second plane. The second portion of the second top fabric may lie in the second plane.

The first bottom fabric may include a first portion, a second portion, and a third portion coupled between the first and the second portions. The first and the third portions of the first bottom fabric may lie in a fourth plane spaced apart from, parallel with, and below the third plane. The second portion of the first bottom fabric may lie in a fifth plane spaced apart from, parallel with, and below the fourth plane.

The second bottom fabric may include a first portion, a second portion, and a third portion coupled between the first and the second portions. The first and second portions of the second bottom fabric may lie in a sixth plane spaced apart from, parallel with, and below the fifth plane. The third portion of the second bottom fabric may lie in the fifth plane.

In some embodiments, the first top fabric may include a first portion, a second portion, and a third portion coupled between the first and the second portions. The first and third portions of the first top fabric may lie in a second plane. The second portion of the first top fabric may lie in a first plane spaced apart from, parallel with, and above the second plane.

The second top fabric may include a first portion, a second portion, and a third portion coupled between the first and the second portions. The first and third portions of the second top fabric may lie in a third plane spaced apart from, parallel with, and below the second plane. The second portion of the second top fabric may lie in the second plane.

The first bottom fabric may include a first portion, a second portion, and a third portion coupled between the first and the second portions. The second and the third portions of the first bottom fabric may lie in a fourth plane spaced apart from, parallel with, and below the third plane. The first portion of the first bottom fabric may lie in a fifth plane spaced apart from, parallel with, and below the fourth plane.

The second bottom fabric may include a first portion, a second portion, and a third portion coupled between the first and the second portions. The first and second portions of the second bottom fabric may lie in a sixth plane spaced apart from, parallel with, and below the fifth plane. The third portion of the second bottom fabric may lie in the fifth plane.

In some embodiments, the first top fabric may be curved extending downwardly toward the second top fabric in a concave shape. The second top fabric may be about flat. The first bottom fabric may be about flat. The second bottom fabric may be curved extending upwardly toward the first bottom fabric in a concave shape.

In some embodiments, the first top fabric may be curved extending downwardly toward the second top fabric in a concave shape. The second top fabric may be curved extending downwardly toward the first bottom fabric in a concave shape. The first bottom fabric may be curved extending upwardly toward the second top fabric in a concave shape. The second bottom fabric may be curved extending upwardly toward the first bottom fabric in a concave shape.

In some embodiments, the first and second top fabrics may have about the same shape. The first and second bottom fabrics may have about the same shape.

In some embodiments, the first top fabric may include a first portion, second portions, and a third portion coupled between the first and the second portions. The first and second portions of the first top fabric may be curved and extend upwardly in a convex shape. The third portion of the first top fabric may be curved and extend downwardly in a concave shape. The second top fabric may be about flat. The first bottom fabric may be about flat. The second bottom fabric may include a first portion, a second portion, and a third portion coupled between the first and the second portions. The first and second portions of the second bottom fabric may be curved and extend downwardly in a convex shape. The third portion of the second bottom fabric may be curved and extend upwardly in a concave shape.

In some embodiments, the ceramic matrix composite seal may include a reinforcement structure extending through the third portion of the first top fabric to the third portion of the second bottom fabric.

In some embodiments, a slot may be formed in a surface of the ceramic matrix composite seal between the first and the second fiber assemblies. The slot may extend along a length of the ceramic matrix composite seal.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figures 1, 2:
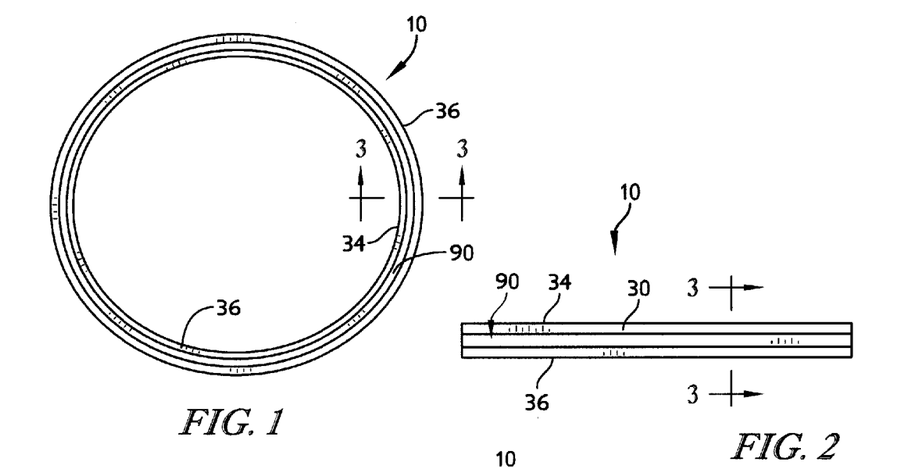
FIG. 1 is a front elevation view of an annular strip seal in accordance with the present disclosure.
FIG. 2 is a front elevation view of a liner strip seal in accordance with the present disclosure.

A strip seal 10 in accordance with the present disclosure is shown, for example, in FIG. 1. The strip seal 10 provides compliance to allow the strip seal 10 to be pre-loaded. Additionally, the strip seal 10 may be used in applications with a broader range of groove or gap tolerances.

In some embodiments, the strip seal 10 has a constant cross section. In some embodiments, the strip seal 10 has a varying cross section. In some embodiments, the strip seal 10 includes features that allow a number strip seals 10 to be used within a single assembly. In some embodiments, for example, a number of strip seals 10 are assembled end to end. In some embodiments, for example, a number of strip seals 10 are stacked together to achieve a desired effect. In some embodiments, the strip seal 10 is formed into a continuous hoop, as shown in FIG. 1, or a split hoop for sealing requirements on cylinders. In some embodiments, for example, the strip seal 10 is formed into a substantially linear ribbon as shown in FIG. 2. In some embodiments, the strip seal 10 is formed into other polygonal shapes.

The strip seal 10 may be made from a number of different materials. In some embodiments, the strip seal 10 is formed from at least one of carbon, silicon carbide, alumina, aluminosilicate or other carbide, nitride, boride or glass fibers. In some embodiments, the strip seal 10 includes a reinforcement structure 20. In some embodiments, the reinforcement structure 20 is a laminate and includes multi-directional reinforcements, for example, fabric, chopped fiber mat, or uni-directional layers. In some embodiments, the reinforcement structure 20 is locally stitched, woven, or otherwise reinforced to increase mechanical integrity. In some embodiments, the reinforcement structure 20 is entirely stitched, woven, or otherwise reinforced to maximize mechanical integrity.

The strip seal 10 includes a matrix material 12. The matrix material 12 may be, for example, silicon, silicon carbide, carbon, boron carbide, alumina, aluminosilicate or any other desirable ceramic including combinations. In some embodiments, the strip seal 10 is made of a combination of fibers and/or matrices as required by the design to optimize performance and cost. In some embodiments, the strip seal 10 includes a coating 14 for protection from the operational environment. In some embodiments, the coating 14 is thin. In some embodiments, the strip seal 10 includes no coating 14. The strip seal 10 may be configured to adjust the level of the preload applied to the strip seal 10, seal maximum deflection, seal dynamic behavior, and seal stiffness.

The strip seal 10 is flexible and deforms plastically. The shape of the strip seal 10 and the process used to form the strip seal 10 gives the strip seal 10 flexibility. The strip seal 10 may be formed to have one of a variety of cross-sections. A first embodiment of the strip seal 10 has a first cross-section is shown in FIGS. 1-8.

Figure 7A:
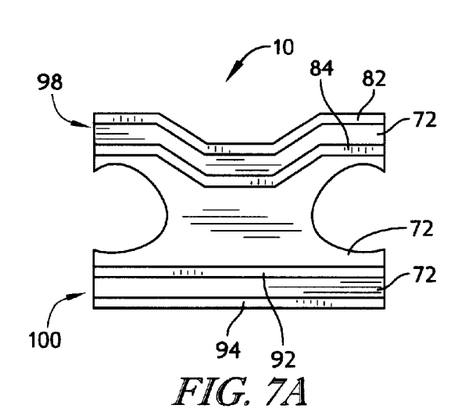
FIG. 7A is a cross-sectional diagrammatic view of another embodiment of a strip seal in accordance with the present disclosure showing that the top fabric assembly and the bottom fabric assembly may be coupled together with the ceramic matrix to form slots between the top fabric assembly and the bottom fabric assembly.
Figure 7B:
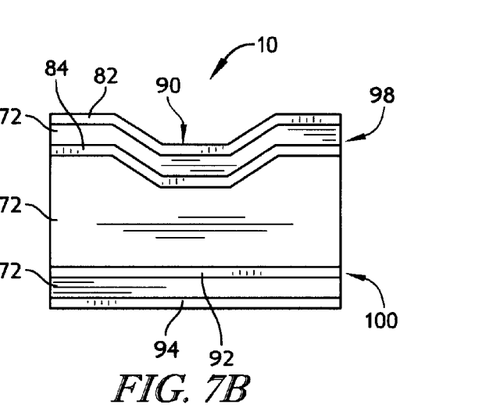
FIG. 7B is a cross-sectional diagrammatic view of another embodiment of a strip seal in accordance with the present disclosure showing that the top fabric assembly and the bottom fabric assembly may be coupled together with the ceramic matrix such that no slots are formed between the top fabric assembly and the bottom fabric assembly.

The strip seal 10 is formed using a number of layers to give the strip seal 10 shape and flexibility. The strip seal 10 is formed from ceramic matrix composite 70. The ceramic matrix composite 70 includes a ceramic matrix 72 and a number of ceramic fiber fabrics 74 embedded in the ceramic matrix 72 as shown in FIGS. 7A and 7B. The number of ceramic fiber fabrics 74 may be embedded in the ceramic matrix 72 by a variety of methods. For example, the ceramic fiber fabrics 74 may be embedded in the ceramic matrix 72 by chemical vapor infiltration (CVI) or polymer infiltration. Any number of ceramic fiber fabrics 74 may be embedded in the ceramic matrix 72 in a given process.

In some embodiments, for example, all of the ceramic fiber fabrics 74 are embedded in the ceramic matrix 72 in one process. In some embodiments, the ceramic fiber fabrics 74 are embedded in the ceramic matrix 72 one at a time. Additional ceramic fiber fabrics 74 impart more flexibility into the strip seal 10 than one ceramic fiber fabric 74 with an equivalent size of the additional ceramic fiber fabrics 74.

The ceramic matrix 72 composite may be one or more of a variety of materials. For example, the ceramic matrix 72 may be Silicon Carbide (SiC), alumina, and/or Boron Carbide. Each of the ceramic fiber fabrics 74 may be at least one of a number of different types of ceramic fiber fabrics. For example, the ceramic fiber fabrics 74 may be chopped fiber, fiber tows, woven tows, or woven tows with fiber reinforcement. The ceramic fiber fabrics 74 may be one or more of a variety of materials. For example, the ceramic fiber fabrics 74 may be Hi-Nicalon, alumina, aluminosilicate, and/or Carbon.

Figure 5:
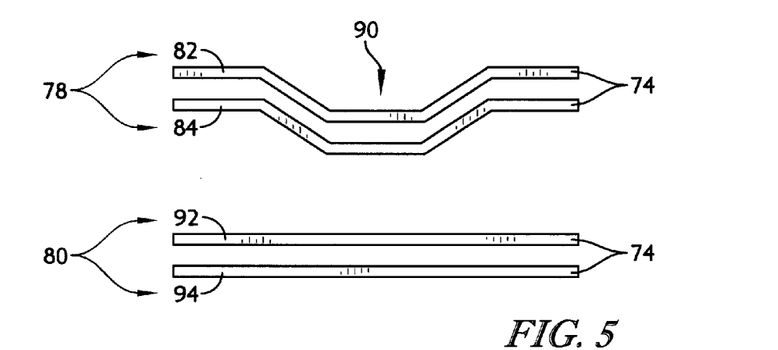
FIG. 5 is a cross-sectional diagrammatic view of another embodiment of a strip seal in accordance with the present disclosure showing that the strip seal includes a number of ceramic fiber fabrics spaced apart from each other, the ceramic fiber fabrics having a desired geometry to give the strip seal a desired geometry.

In the illustrative embodiment, the strip seal 10 includes four ceramic fiber fabrics 74 as shown in FIG. 5. The ceramic fiber fabrics 74 are formed to have a desired front shape as seen in a cross-sectional view as shown in FIG. 5. The ceramic fiber fabrics 74 are also formed to have a desired top shape as seen in a plan view as shown in FIGS. 1 and 2. As disclosed in more detail below, the front shape of ceramic fiber fabrics 74 may be formed to give the strip seal 10 a variable amount of flexibility and to control the expansion direction of the strip seal 10.

The strip seal 10 includes a top fabric assembly 78 and a bottom fabric assembly 80 as shown in FIG. 5. The top fabric assembly 78 includes a first top fabric 82 and a second top fabric 84 spaced apart from the first top fabric 82. The second top fabric 84 may be spaced apart from the first top fabric 82 by any distance required to give the strip seal 10 a desired thickness and/or flexibility. In the illustrative embodiment, a depression 90 is formed in the first and second top fabrics 82, 84. The depression 90 extends along the length of the strip seal 10.

The boottom fabric assembly 80 includes a first bottom fabric 92 and a second bottom fabric 94 spaced apart from first bottom fabric 92. The second bottom fabric 94 may be spaced apart from the first bottom fabric 92 by any distance required to give the strip seal 10 a desired thickness and/or flexibility. In the illustrative embodiment, the first and second bottom fabrics 92, 94 are about flat.

In the illustrative embodiment, the strip seal 10 is better at compressive loads applied vertically rather than horizontally because the bottom fabric assembly 80 is about flat. The fabric assemblies 78, 80 that have the ceramic fiber fabrics 74 that are about flat do not deform well when a load is parallel to the flat ceramic fiber fabrics 74. As such, the strip seals 10 with the all non-flat ceramic fiber fabrics 74 perform better than the flat ceramic fiber fabrics 74 under either or both vertical and horizontal loads.

The top fabric assembly 78 is embedded in the ceramic matrix 72 to form the top ceramic matrix composite assembly 98. The bottom fabric assembly 80 is embedded in the ceramic matrix 72 to form the bottom ceramic matrix composite assembly 100. In some embodiments, the top and bottom fabric assemblies 78, 80 are embedded into the ceramic matrix 72 in the same process. In some embodiments, the top and bottom fabric assemblies 78, 80 are embedded into the ceramic matrix 72 in different processes.

Figure 6:
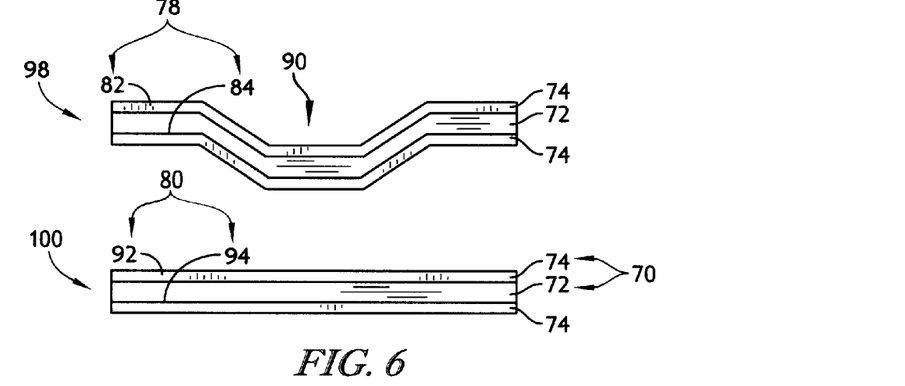
FIG. 6 is a cross-sectional diagrammatic view of the ceramic fiber fabrics of FIG. 5 embedded in a ceramic matrix to form a top fabric assembly and a bottom fabric assembly.

The ceramic matrix 72 is formed between and permeates the first top fabric 82 and the second top fabric 84 to form the top ceramic matrix composite assembly 98 as shown in FIG. 6. Likewise, the ceramic matrix 72 is formed between and permeates the first bottom fabric 92 and the second bottom fabric 94 to form the bottom ceramic matrix composite assembly 100 as shown in FIG. 6.

The top ceramic matrix composite assembly 98 is spaced apart from the bottom ceramic matrix composite assembly 100 by a variable distance to give the strip seal 10 a desired seal height 42 as shown in FIG. 6. The top and bottom ceramic matrix composite assemblies 98, 100 are coupled together by the ceramic matrix 72 to form the strip seal 10. In some embodiments, the strip seal 10 is formed in one process.

In some embodiments, the seal slots 48 are formed in the ceramic matrix 72 between the top and bottom ceramic matrix composite assemblies 98, 100 as shown in FIG. 7A. In some embodiments, no slots are formed in the ceramic matrix 72 and the space between the top and bottom ceramic matrix assemblies 98, 100 is entirely filled by the ceramic matrix 72 as shown in FIG. 7B.

In some embodiments, the strip seal 10 is coated with a coating 14. The coating 14 may be applied to any one or more surfaces of the strip seal 10. The coating 14 may have any desirable thickness.

Figure 8:
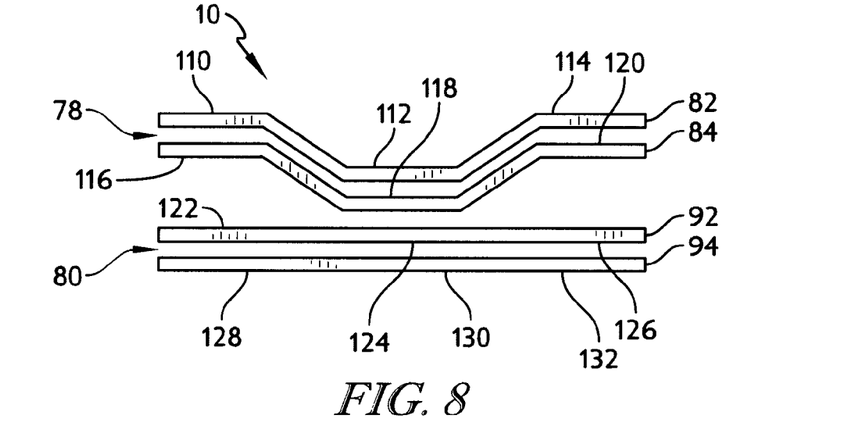
FIG. 8 is a cross-sectional diagrammatic view of another embodiment of a strip seal in accordance with the present disclosure with a first ceramic fiber fabric geometry.

Each ceramic fiber fabric 74 may be formed into a desired shape. The ceramic fiber fabrics 74 include a number of portions having different shapes and positions to give the strip seal 10 a desired shape. Referring to FIG. 8, the first top fabric 82 includes a first portion 110, a second portion 114, and a third portion 112 coupled between the first and second portions 110, 114. In the illustrative embodiment, the first and second portions 110, 114 lie in a first plane. The third portion 112 lies in a second plane spaced apart from, parallel with, and below the first plane.

The second top fabric 84 includes a first portion 116, a second portion 120, and a third portion 118 coupled between the first and second portions 116, 120. In the illustrative embodiment, the first and second portions 116, 120 lie in the second plane. The third portion 118 lies in a third plane spaced apart from, parallel with, and below the second plane.

The first bottom fabric 92 includes a first portion 122, a second portion 126, and a third portion 128 coupled between the first and second portions 122, 126. In the illustrative embodiment, the first, second, and third portions 122, 126, 124 lie in a fourth plane spaced apart from, parallel with, and below the third plane.

The second bottom fabric 94 includes a first portion 128, a second portion 132, and a third portion 130 coupled between the first and second portions 128, 132. In the illustrative embodiment, the first, second, and third portions 128, 132, 130 lie in a fifth plane spaced apart from, parallel with, and below the fourth plane.

Figure 3:
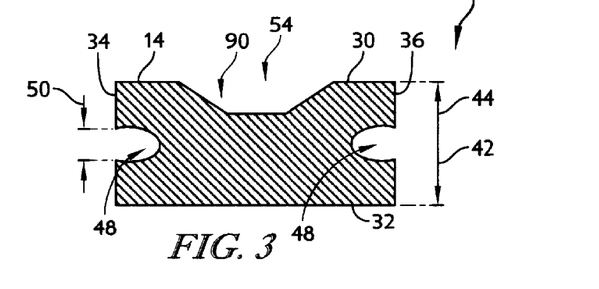
FIG. 3 is cross-sectional diagrammatic view of the strip seal of FIG. 1 or 2 taken along line 3-3.
Figure 4:
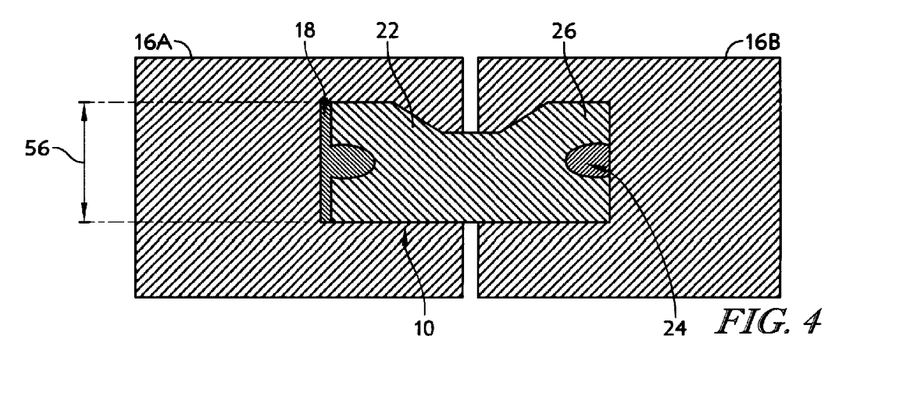
FIG. 4 is a cross-sectional diagrammatic view of an exemplary sealing application using the strip seal of FIG. 2.

Referring to FIGS. 3 and 4, the strip seal 10 includes an upper surface 30, a lower surface 32 spaced apart from and opposite the upper surface 30, a first side wall 34, and a second side wall 36 spaced apart from and opposite the first side wall 34. The upper surface 30 is spaced apart from the lower surface 32 by a seal height 42. When the strip seal 10 is uncompressed, the seal height 42 is equal to a seal thickness 44.

The upper surface 30 includes a depression 90 such that the upper surface 30 forms a valley 54. In the illustrative embodiment, the upper surface 30 includes obtuse angles that form the valley 54. In some embodiments, the upper surface 30 includes right or acute angles that form the valley 54. In some embodiments, the upper surface 30 is curved to form the valley 54.

The first and second side walls 34, 36 are each formed to define a seal slot 48 extending the length of the strip seal 10. The seal slots 48 allow the strip seal 10 to deform. The seal slots 48 allow the top fabric assembly 78 and the bottom fabric assembly 80 to depress toward each other, compressing the size of the strip seal 10. As the strip seal 10 compresses, the strip seal 10 stores potential energy. As such, when the strip seal 10 is no longer compressed, the strip seal 10 expands towards its uncompressed shape.

The seal slots 48 may be any desired shape. In the illustrative embodiment, the seal slots 48 are C shaped. In some embodiments, the seal slots 48 are U shaped. In some embodiments, the seal slot 48 included in the first side wall 34 has a different shape than the seal slot 48 included in the second side wall 36. The seal slots 48 have a seal-slot height 50 as shown in FIG. 3. The seal-slot height may be a variety of magnitudes. In the illustrative embodiment, the seal-slot height 50 is about 0.015 inches when the strip seal 10 is uncompressed.

The strip seal 10 is formed to have a desired cross-section such that the strip seal 10 may be assembled with a number of components 16 having mating cross-sections. The components 16 may be one or more of a variety of components 16. In the illustrative embodiment, the components 16 are gas turbine engine components 16 configured to be exposed to high temperatures. In the illustrative embodiment, the strip seal 10 is shown assembled with a first component 16A and a second component 16B. In some embodiments, the strip seal 10 is assembled with additional components.

As shown in FIG. 4, the component 16A, 16B have component slots 18, 24, respectively, configured to receive a portion of the strip seal 10. In the illustrative embodiment, a first component 16A includes first component slot 18 configured to receive a first portion 22 of strip seal 10 and a second component 16B includes the second component slot 24 configured to receive a second portion 26 of strip seal 10. In some embodiments, the component slots 18, 24 extend through the components 16A, 16B. In some embodiments, the component slots 18, 24 extends partially through the components 16A, 16B.

The component slots 18, 24 have a component-slot height 56. In some embodiments, the component-slot height 56 is about equal to the seal height 42. In some embodiments, the component-slot height 56 is less than the seal height 42, such that the strip seal 10 is compressed and/or pre-loaded when assembled in the component slots 18, 24. The strip seal 10 is inserted into the component slots 18, 24 and couples to the component 16A to 16B. The component 16A may additionally be coupled to the component 16B by one or more fasteners, for example, a bolt or screw.

When the component-slot height 56 is less than the seal height 42, the seal slots 48 compress and the seal-slot height 50 is reduced. Preload in the strip seal 10 reduces and/or eliminates movement and wear of the strip seal 10. The strip seal 10 is flexible and deforms plastically when compressed. In the illustrative embodiment, the seal slots 48 are sized such that when the strip seal 10 is compressed, the top fabric assembly and the bottom fabric assembly 78, 80 deform plastically and contact each other. The strip seal 10 is thus designed to have infinite life in terms of compression cycles because the top fabric assembly and the bottom fabric assembly 78, 80 block each other from deflecting past their plastic deformation limits.

The strip seal 10 and the component slots 18, 24 are sized such that the strip seal 10 contacts the components 16 to create a seal between the strip seal 10 and the components 16 as well as a seal between the components 16A and 16B. In some embodiments, the components 16 are exposed to high temperatures. The high temperatures cause the components 16 to expand. As the components 16 expand, the component slots 18, 24 expand. The strip seal 10 may not expand proportionally with the component slots 18, 24. As such, when the component slots 18, 24 expand, the strip seal 10 may loose contact with the components 16 and may partially or entirely loose its sealing ability.

Sizing the component-slot height 56 smaller than the seal height 42 can overcome the loss of contact when the components 16 and the strip seal 10 are exposed to high temperatures. The strip seal 10 is preloaded and/or forced into the smaller component-slot height 56. When the components 16 are cool, the compression of the strip seal 10 by the components 16 results in contact between the strip seal 10 and the components 16 to produce an acceptable seal. As the components 16 are heated and the component slots 18, 24 expand, the components 16 apply less force to the strip seal 10. The strip seal 10 expands towards its pre-compression seal height 42 as less force is applied to the strip seal 10. The strip seal 10 remains in contact with the components 16 because the strip seal 10 expands as the component slots 18, 24 expand. As such, the strip seal 10 maintains an acceptable seal as the components 16 and the strip seal 10 are heated. When the components 16 and the strip seal 10 cool, the component slots 18, 24 contract and compress the strip seal 10. The strip seal 10 is designed to experience a predetermined number of cycles of expanding and contracting without failing.

The component slots 18, 24 may extend into the components 16 by a variety of depths. In some embodiments, the component slots 18, 24 extend into the components 16 such that the side walls 34, 36 are proximate or contacting the components 16 as shown in component 16B of FIG. 4. In some embodiments, the component slots 18, 24 extend into the components 16 such that the side walls 34, 36 are spaced apart from the components 16 as shown in 16A of FIG. 4.

Figure 9:
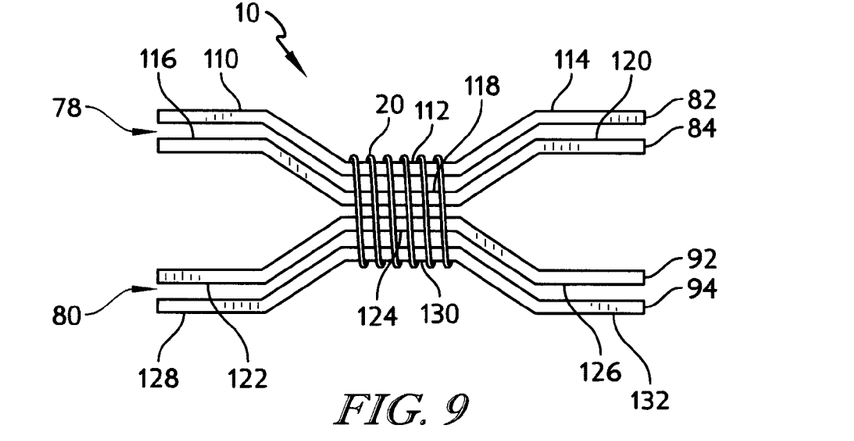
FIG. 9 is a cross-sectional diagrammatic view of another embodiment of a strip seal in accordance with the present disclosure with a second ceramic fiber fabric geometry, the strip seal having fiber reinforcement.
Figure 10:
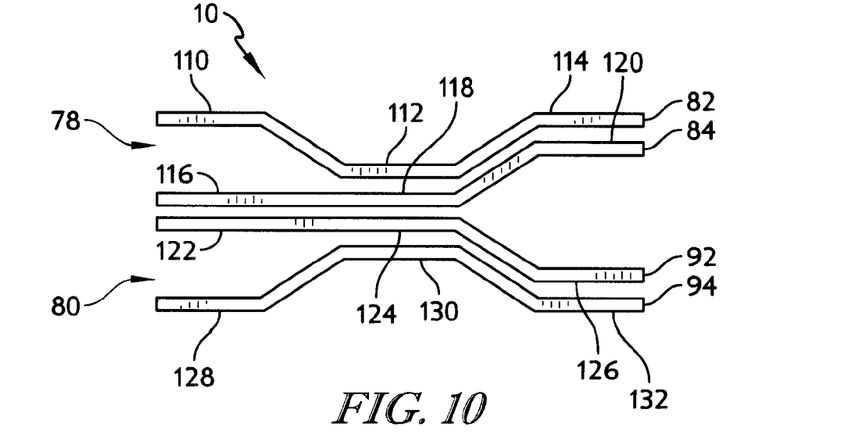
FIG. 10 is a cross-sectional diagrammatic view of another embodiment of a strip seal in accordance with the present disclosure with a third ceramic fiber fabric geometry.
Figures 11, 12, 13, 14:
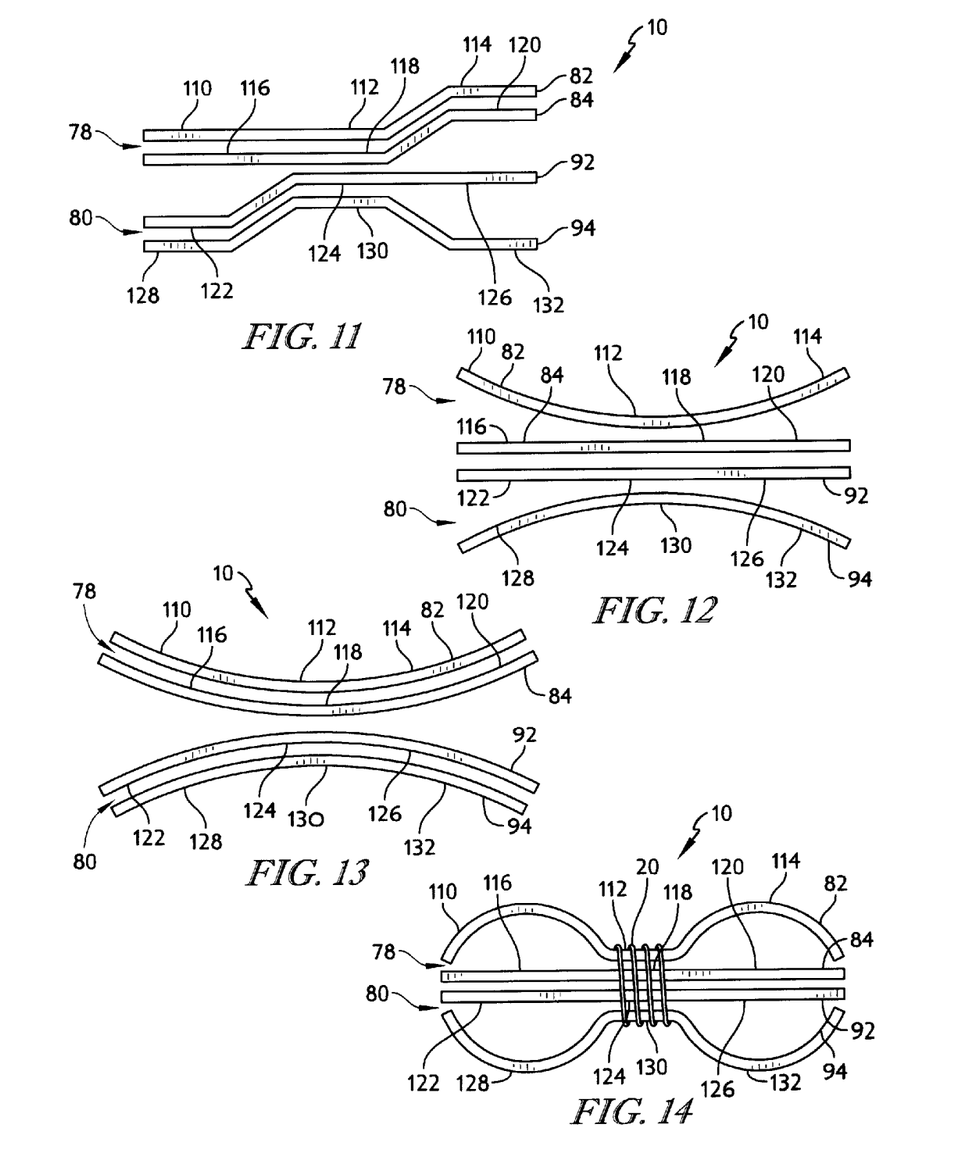
FIG. 11 is a cross-sectional diagrammatic view of another embodiment of a strip seal in accordance with the present disclosure with a fourth ceramic fiber fabric geometry.
FIG. 12 is a cross-sectional diagrammatic view of another embodiment of a strip seal in accordance with the present disclosure with a fifth ceramic fiber fabric geometry.
FIG. 13 is a cross-sectional diagrammatic view of another embodiment of a strip seal in accordance with the present disclosure with a sixth ceramic fiber fabric geometry.
FIG. 14 is a cross-sectional diagrammatic view of another embodiment of a strip seal in accordance with the present disclosure with seventh ceramic fiber fabric geometry, the strip seal having fiber reinforcement.

FIGS. 8-14 are cross-sectional views of embodiments of the strip seal 10. Each FIG. 8-14 show an embodiment of the strip seal 10 having different desired geometries to give the strip seal 10 a desired geometry and flexibility and to assert pressure in a desired direction. FIGS. 8-14 show only the ceramic fiber fabrics 74 of the strip seal 10. In some embodiments, the ceramic fiber fabrics 74 in FIGS. 8-14 may be embedded in the ceramic matrix 72 such that a slot is formed in either or both sides of the strip seal 10 between the top and bottom ceramic matrix composite assemblies 98, 100. FIG. 8 is a cross-sectional view the strip seal 10 of FIGS. 1-7B. FIGS. 9 and 14 show embodiments of the strip seal 10 that include the reinforcement structure 20.

EXAMPLES

1: SiC/SiC Ceramic Matrix Composite Seal

A Hi-Nicalon ceramic fiber fabric is constructed at 30% fiber volume using an angle interlock 3D architecture. The ceramic fiber fabric is woven to the geometry in FIG. 8 and processed with a chemical vapor infiltration (CVI) Silicon Carbide (SiC) matrix to leave about a 0.015 inch gap between the top ceramic matrix composite assembly 98 and the bottom ceramic matrix composite assembly 100.

The seal is designed to be preloaded by about 0.002 to 0.005 inches allowing about 0.010 inches for movement during operation. The seal is designed so that the stresses at max deflection will tolerate $10^{10}$ cycles. The seal is used to join a set of 36 high-pressure turbine seal segments in a commercial aircraft turbine engine.

2: Oxide/Oxide Ceramic Matrix Composite Seal

An alumina fiber ceramic fiber fabric is constructed from a laminate with aluminosilicate fiber reinforcement in the center as shown in FIG. 12. The ceramic fiber fabric is rigidized using an alumina matrix. The seal is designed to be preloaded by about 0.010 to 0.015 inches, allowing about 0.015 inches for movement during operation. The seal is designed so that the stresses at max deflection will tolerate $10^{10}$ cycles with only 20% softening through the life. The seal is used to join adjacent sections of exhaust for a commercial aircraft turbine engine 3: C/SiC Ceramic Matrix Composite Seal An AS4 carbon fiber ceramic fiber fabric is constructed at 38% fiber volume using an angle interlock 3D architecture. The ceramic fiber fabric is woven to the geometry in FIG. 14 and processed with a chemical vapor infiltration (CVI) Silicon Carbide (SiC)/Boron Carbide matrix to leave about a 0.075 inch gap between the top and bottom ceramic matrix composite assemblies.

The seal is designed to be preloaded by about 0.010 to 0.015 inches vertically, thereby applying horizontal pressure to create additional sealing surfaces. The seal is designed so that the stresses at max deflection will tolerate $10^5$ cycles. The seal is used to seal the outlet of a combustor in a short life turbine engine.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:
1. A ceramic matrix composite seal comprising:
   a ceramic matrix,
   a first fiber assembly embedded in the ceramic matrix, the first fiber assembly including a first top fabric and a second top fabric, a second fiber assembly embedded in the ceramic matrix, the second fiber assembly including a first bottom fabric and a second bottom fabric, the second fiber assembly spaced apart from and opposite the first fiber assembly, wherein the second top fabric of the first fiber assembly is coupled to the first bottom fabric of the second fiber assembly by the ceramic matrix, the first top fabric and the second top fabric determine the shape of the first fiber assembly, and the first bottom fabric and the second bottom fabric determine the shape of the second fiber assembly and, flexible seal slots including a first flexible seal slot and a second flexible seal slot formed in first and second sidewalls, respectively, of the ceramic matrix and sandwiched between the first fiber assembly and the second fiber assembly and extending longitudinally along an entire length of the ceramic matrix composite seal, wherein the ceramic matrix composite seal includes a first component and a second component and the flexible seal slots are in contact with the first component and the second component such that the first component and the second component remain in contact while the components expand, contract, and vibrate, wherein the ceramic matrix composite seal has a first end portion and a second end portion, and wherein the first end portion of the ceramic matrix composite seal includes the first sidewall, the first flexible seal slot, and first end portions of the first top fabric and the second bottom fabric that are received into a first slot of the first component and the second end portion of the ceramic matrix composite seal includes the second sidewall, the second flexible seal slot, and second end portions of the first top fabric and the second bottom fabric that are received into a second slot of the second component.

2. The ceramic matrix composite seal of claim 1, wherein the second fiber assembly is about flat and the first fiber assembly includes a depression along a length of the first fiber assembly at a center of the first fiber assembly, and the depression extends toward the second fiber assembly.

3. The ceramic matrix composite seal of claim 1, wherein the first fiber assembly includes a first depression along a length of the first fiber assembly at a center of the first fiber assembly, the first depression extending toward the second fiber assembly, and the second fiber assembly includes a second depression along a length of the second fiber assembly at a center of the second fiber assembly, and the second depression extends toward the first fiber assembly.

4. The ceramic matrix composite seal of claim 1, wherein the first top fabric includes a first portion, a second portion, and a third portion coupled between the first and the second portions, the first and second portions of the first top fabric lie in a first plane, the third portion of the first top fabric lies in a second plane spaced apart from, parallel with, and below the first plane, the second top fabric includes a first portion, a second portion, and a third portion coupled between the first and the second portions, the first and second portions of the second top fabric lie in the second plane, the third portion of the second top fabric lies in a third plane spaced apart from, parallel with, and below the second plane, the first bottom fabric includes a first portion, a second portion, and a third portion coupled between the first and the second portions, the first, second, and third portions of the first bottom fabric lie in a fourth plane spaced apart from, parallel with, and below the third plane, and the second bottom fabric includes a first portion, a second portion, and a third portion coupled between the first and the second portions, the first, second, and third portions of the second bottom fabric lie in a fifth plane spaced apart from, parallel with, and below the fourth plane.

5. The ceramic matrix composite seal of claim 1, wherein the first top fabric includes a first portion, a second portion, and a third portion coupled between the first and the second portions, the first and second portions of the first top fabric lie in a first plane, the third portion of the first top fabric lies in a second plane spaced apart from, parallel with, and below the first plane, the second top fabric includes a first portion, a second portion, and a third portion coupled between the first and the second portions, the first and second portions of the second top fabric lie in the second plane, the third portion of the second top fabric lies in a third plane spaced apart from, parallel with, and below the second plane, the first bottom fabric includes a first portion, a second portion, and a third portion coupled between the first and the second portions, the first and the second portions of the first bottom fabric lie in a fourth plane spaced apart from, parallel with, and below the third plane, the third portion of the first bottom fabric lies in a fifth plane spaced apart from, parallel with, and below the fourth plane, and the second bottom fabric includes a first portion, a second portion, and a third portion coupled between the first and the second portions, the first and second portions of the second bottom fabric lie in the fifth plane, and the third portion of the second bottom fabric lies in a sixth plane spaced apart from, parallel with, and below the fifth plane.

6. The ceramic matrix composite seal of claim 5 further including reinforcement structure extending through the third portions of the first top fabric, second top fabric, first bottom fabric, and the second bottom fabric in a direction about perpendicular to the first plane.

7. The ceramic matrix composite seal of claim 1, wherein the first top fabric includes a first portion, a second portion, and a third portion coupled between the first and the second portions, the first and second portions of the first top fabric lie in a first plane, the third portion of the first top fabric lies in a second plane spaced apart from, parallel with, and below the first plane, the second top fabric includes a first portion, a second portion, and a third portion coupled between the first and the second portions, the first and third portions of the second top fabric lie in a third plane spaced apart from, parallel with, and below the second plane, the second portion of the second top fabric lies in the second plane, the first bottom fabric includes a first portion, a second portion, and a third portion coupled between the first and the second portions, the first and the third portions of the first bottom fabric lie in a fourth plane spaced apart from, parallel with, and below the third plane, the second portion of the first bottom fabric lies in a fifth plane spaced apart from, parallel with, and below the fourth plane, and the second bottom fabric includes a first portion, a second portion, and a third portion coupled between the first and the second portions, the first and second portions of the second bottom fabric lie in a sixth plane spaced apart from, parallel with, and below the fifth plane, and the third portion of the second bottom fabric lies in the fifth plane.

8. The ceramic matrix composite seal of claim 1, wherein the first top fabric includes a first portion, a second portion, and a third portion coupled between the first and the second portions, the first and third portions of the first top fabric lie in a second plane, the second portion of the first top fabric lies in a first plane spaced apart from, parallel with, and above the second plane, the second top fabric includes a first portion, a second portion, and a third portion coupled between the first and the second portions, the first and third portions of the second top fabric lie in a third plane spaced apart from, parallel with, and below the second plane, the second portion of the second top fabric lies in the second plane, the first bottom fabric includes a first portion, a second portion, and a third portion coupled between the first and the second portions, the second and the third portions of the first bottom fabric lie in a fourth plane spaced apart from, parallel with, and below the third plane, the first portion of the first bottom fabric lies in a fifth plane spaced apart from, parallel with, and below the fourth plane, and the second bottom fabric includes a first portion, a second portion, and a third portion coupled between the first and the second portions, the first and second portions of the second bottom fabric lie in a sixth plane spaced apart from, parallel with, and below the fifth plane, and the third portion of the second bottom fabric lies in the fifth plane.

9. The ceramic matrix composite seal of claim 1, wherein the first top fabric is curved extending downwardly toward the second top fabric in a concave shape, the second top fabric is about flat,
the first bottom fabric is about flat, and
the second bottom fabric is curved extending upwardly toward the first bottom fabric in a concave shape.

10. The ceramic matrix composite seal of claim 1, wherein the first top fabric is curved extending downwardly toward the second top fabric in a concave shape, the second top fabric is curved extending downwardly toward the first bottom fabric in a concave shape,
the first bottom fabric is curved extending upwardly toward the second top fabric in a concave shape,
the second bottom fabric is curved extending upwardly toward the first bottom fabric in a concave shape.

11. The ceramic matrix composite seal of claim 10, wherein the first and second top fabrics have about the same shape and the first and second bottom fabrics have about the same shape.

12. The ceramic matrix composite seal of claim 1, wherein the first top fabric includes a first portion, a second portions, and a third portion coupled between the first and the second portions, the first and second portions of the first top fabric are curved and extend upwardly in a convex shape, the third portion of the first top fabric is curved and extends downwardly in a concave shape, the second top fabric is about flat,
the first bottom fabric is about flat, and
the second bottom fabric includes a first portion, a second portion, and a third portion coupled between the first and the second portions, the first and second portions of the second bottom fabric are curved and extend downwardly in a convex shape, and the third portion of the second bottom fabric is curved and extends upwardly in a concave shape.

13. The ceramic matrix composite seal of claim 12 further including reinforcement structure extending through the third portion of the first top fabric to the third portion of the second bottom fabric.

14. The ceramic matrix composite seal of the claim 13, wherein a slot is formed in a surface of the ceramic matrix composite seal between the first and the second fiber assemblies, the slot extending along a length of the ceramic matrix composite seal.

15. A ceramic matrix composite seal comprising:
a ceramic matrix,
a first fiber assembly embedded in the ceramic matrix, the first fiber assembly including a first top fabric and a second top fabric,
a second fiber assembly embedded in the ceramic matrix, the second fiber assembly including a first bottom fabric and a second bottom fabric, the second fiber assembly spaced apart from and opposite the first fiber assembly, and
flexible seal slots including a first flexible seal slot and a second flexible seal slot formed in first and second sidewalls, respectively, of the ceramic matrix and sandwiched between the first fiber assembly and the second fiber assembly and extending longitudinally along an entire length of the ceramic matrix composite seal, wherein the ceramic matrix composite seal includes a first component and a second component and wherein the flexible seal slots are in contact with the first component and the second component such that the first component and the second component remain in contact while the components expand, contract, and vibrate, wherein the ceramic matrix composite seal has a first end portion and a second end portion, wherein the first end portion of the ceramic matrix composite seal includes the first sidewall, the first flexible seal slot, and first end portions of the first top fabric and the second bottom fabric that are received into a first slot of the first component and the second end portion of the ceramic matrix composite seal includes the second sidewall, the second flexible seal slot, and second end portions of the first top fabric and the second bottom fabric that are received into a second slot of the second component,
wherein the second top fabric of the first fiber assembly is coupled to the first bottom fabric of the second fiber assembly by the ceramic matrix, the first top fabric and the second top fabric determine the shape of the first fiber assembly, and the first bottom fabric and the second bottom fabric determine the shape of the second fiber assembly.

* * * * *

UNITED STATES PATENT AND TRADEMARK OFFICE
CERTIFICATE OF CORRECTION

| | | |
|---|---|---|
| PATENT NO. | : 9,757,920 B2 | Page 1 of 1 |
| APPLICATION NO. | : 14/140663 | |
| DATED | : September 12, 2017 | |
| INVENTOR(S) | : Andrew J. Lazur | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 121 days.

Signed and Sealed this
Sixth Day of February, 2018

Joseph Matal
*Performing the Functions and Duties of the
Under Secretary of Commerce for Intellectual Property and
Director of the United States Patent and Trademark Office*